United States Patent
Axe et al.

(10) Patent No.: US 11,203,964 B2
(45) Date of Patent: Dec. 21, 2021

(54) PARTICULATE MATTER SENSOR CONTAMINATION RECOVERY FROM EXHAUST CONDENSATION

(71) Applicant: GM Global Technology Operations LLC, Detroit, MI (US)

(72) Inventors: Bryan D. Axe, Farmington Hills, MI (US); Gaetano Di Venti, Enna (IT); Francesco Cannarile, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 348 days.

(21) Appl. No.: 16/523,323

(22) Filed: Jul. 26, 2019

(65) Prior Publication Data

US 2021/0025313 A1   Jan. 28, 2021

(51) Int. Cl.
| | |
|---|---|
| *F01N 13/00* | (2010.01) |
| *F01N 3/021* | (2006.01) |
| *B08B 3/08* | (2006.01) |
| *G01N 15/06* | (2006.01) |
| *G01N 15/00* | (2006.01) |

(52) U.S. Cl.
CPC .............. *F01N 13/008* (2013.01); *B08B 3/08* (2013.01); *F01N 3/021* (2013.01); *G01N 15/0656* (2013.01); *F01N 2560/05* (2013.01); *G01N 2015/0046* (2013.01)

(58) Field of Classification Search
CPC .... F01N 13/008; F01N 3/021; F01N 2560/05; F01N 2560/028; F01N 2240/22; F01N 2550/00; B08B 3/08; G01N 15/0656; G01N 2015/0046; G01N 15/0606; Y02T 10/12

See application file for complete search history.

(56) References Cited

U.S. PATENT DOCUMENTS

| | | | | |
|---|---|---|---|---|
| 9,021,868 | B2 * | 5/2015 | Sakamoto | F01N 13/008 |
| | | | | 73/61.71 |
| 9,234,805 | B2 * | 1/2016 | Lin | F02D 41/1494 |
| 9,267,424 | B2 * | 2/2016 | Wicks | F01N 3/101 |
| 9,733,029 | B2 * | 8/2017 | Lee | F28F 1/00 |
| 9,804,074 | B2 * | 10/2017 | Weber | F02D 41/1466 |
| 9,846,110 | B2 * | 12/2017 | Tylutki | G01N 15/0656 |
| 9,932,921 | B2 * | 4/2018 | Hoard | F02M 25/028 |
| 9,964,481 | B2 * | 5/2018 | Zhang | F01N 11/00 |
| 10,060,339 | B2 * | 8/2018 | Wicks | F01N 3/106 |
| 10,738,679 | B2 * | 8/2020 | Hittig | F01N 3/0232 |

(Continued)

*Primary Examiner* — Freddie Kirkland, III
(74) *Attorney, Agent, or Firm* — Vivacqua Crane, PLLC (57) ABSTRACT

A vehicle particulate matter contamination recovery system includes a particulate matter filter receiving exhaust gas from an engine. A particulate matter sensor is positioned downstream of the particulate matter filter, the particulate matter sensor collecting a non-combustible contaminant on a circuit of the particulate matter sensor and generating a current indicating presence of the non-combustible contaminant. A total volume of water collected during multiple cold start operations of the engine is passed onto the sensor acting to at least partially dissolve the non-combustible contaminant. The particulate matter sensor is operated in a remedial action mode of operation having no voltage applied to the circuit of the particulate matter sensor until a quantity of the cold start operations corresponding to the total volume of water is reached.

20 Claims, 4 Drawing Sheets

(56) References Cited

U.S. PATENT DOCUMENTS

| | | | |
|---|---|---|---|
| 11,092,060 B2* | 8/2021 | Orbay | F01N 13/008 |
| 2015/0176478 A1* | 6/2015 | Wicks | F02M 35/10268 |
| | | | 60/599 |
| 2017/0067813 A1* | 3/2017 | Zhang | F02D 41/22 |
| 2019/0048769 A1* | 2/2019 | Eriksson | F01N 3/021 |
| 2019/0301342 A1* | 10/2019 | Orbay | F01N 13/008 |
| 2020/0095912 A1* | 3/2020 | Bouws | F02D 41/16 |

* cited by examiner

PARTICULATE MATTER SENSOR CONTAMINATION RECOVERY FROM EXHAUST CONDENSATION

INTRODUCTION

The present disclosure relates to particulate matter sensors used in automobile vehicle exhaust systems.

Vehicles powered by internal combustion engines including diesel engines, gasoline engines and hybrid vehicles are typically equipped with exhaust after-treatment catalysts, filters, adsorbents, and other devices to comply with regulatory exhaust emission standards for carbon monoxide (CO), unburned hydrocarbons (HC), oxides of nitrogen (NOx), particulate matter (PM), and the like. The effectiveness of exhaust after-treatment devices for removing the regulated emissions can vary with engine operating conditions.

Automobile vehicles and particularly vehicles having diesel engines commonly use a sensor to determine levels of particulate matter that accrue in or pass through a vehicle exhaust system filter during operation. A particulate matter filter is normally provided to meet vehicle emission standards. The particulate matter sensor is used to identify the health of the particulate matter filter, and therefore if the particulate matter filter is deteriorating. Particulate matter sensors commonly include a sensor surface having a circuitry pattern imprinted on the surface. As particulate matter, normally in the form of carbon accrues on the sensor, a circuit is completed by the conductive matter of the exhaust particulates causing a current rise indicative of the amount of particulate matter accumulation over time. The particulate matter may be consumed during normal exhaust system temperature operation or the particulate matter filter can be removed and cleaned periodically to remove built-up particulate matter to ensure accurate sensor readings over time. Exhaust particulate matter as carbon is consumable and therefore may be cleaned from the particulate matter sensor electrical circuit surfaces by heat treatment.

Contaminants which may be entrained in the exhaust gas flow can also accumulate on the particulate matter sensor. Contaminants which are also conductive may cause sensor false or elevated current levels, which can result in faulted or failed sensors. Examples of conductive contaminants include sodium, calcium, manganese and magnesium which are passed through an exhaust system during fuel combustion, and may result from consumption of coolant or oil, or may be contained in a water content of a fuel or in inducted air. These conductive contaminants are not consumable or easily cleaned using heat treatment processes and are therefore not easily removed by known cleaning processes.

Thus, while current vehicle exhaust system particulate matter sensors achieve their intended purpose, there is a need for a new and improved system and method for recovery of particulate matter sensors contaminated by non-consumable materials.

SUMMARY

According to several aspects, a vehicle particulate matter contamination recovery system includes a filter. A sensor collects a non-combustible contaminant while positioned downstream of the filter. A volume of water passing onto the sensor acts to dissolve the non-combustible contaminant.

In another aspect of the present disclosure, the filter defines a particulate matter filter.

In another aspect of the present disclosure, the sensor defines a particulate matter sensor.

In another aspect of the present disclosure, the volume of water is created during a cold start operation of an engine discharging exhaust gas into the filter and from surfaces of an exhaust system below a dew point.

In another aspect of the present disclosure, the volume of water is created during multiple cold start operations of an engine connected to and discharging exhaust gas into the filter and wherein the particulate matter sensor is operated with a zero supply voltage to a sensor circuit for a quantity of the multiple cold start operations to obtain the volume of water.

In another aspect of the present disclosure, the engine defines a diesel engine; and the quantity of the multiple cold start operations to obtain the volume of water ranges from two up to approximately thirty-five.

In another aspect of the present disclosure, the non-combustible contaminant includes a conductive sodium operating to at least partially close a circuit of the sensor until dissolved by the water.

In another aspect of the present disclosure, the non-combustible contaminant includes a conductive calcium operating to at least partially close a circuit of the sensor until dissolved by the water.

In another aspect of the present disclosure, the non-combustible contaminant includes a conductive manganese operating to at least partially close a circuit of the sensor until dissolved by the water.

In another aspect of the present disclosure, the non-combustible contaminant includes a conductive water-soluble contaminant operating to at least partially close a circuit of the sensor until dissolved by the water.

According to several aspects, the vehicle particulate matter contamination recovery system includes a particulate matter filter receiving exhaust gas from an engine. A particulate matter sensor is positioned downstream of the particulate matter filter, the particulate matter sensor collecting a non-combustible contaminant on a circuit of the particulate matter sensor and generating a current indicating presence of the non-combustible contaminant. A total volume of water collected during multiple cold start operations of the engine passes onto the sensor acting to at least partially dissolve the non-combustible contaminant. The particulate matter sensor is operated in a remedial action mode of operation having no voltage applied to the circuit of the particulate matter sensor until a quantity of the cold start operations corresponding to the total volume of water is reached.

In another aspect of the present disclosure, a current difference determined between a curve representing an output current for the particulate matter sensor in a nominal, non-contaminated state and an output current of the particulate matter sensor.

In another aspect of the present disclosure, a difference between the current difference and data saved in a lookup table defines a level of contamination of the particulate matter sensor.

In another aspect of the present disclosure, the total volume of water collected during the multiple cold start operations of the engine is divided by a predetermined volume of water produced during one cold start operation of the engine to determine the quantity of the cold start operations corresponding to the total volume of water to achieve cleaning of the particulate matter sensor.

In another aspect of the present disclosure, the particulate matter sensor is maintained in a dormant state during cleaning of the particulate matter sensor mitigating against conditions that cause further contaminants to be attracted to the particulate matter sensor.

In another aspect of the present disclosure, a predetermined current response produced within a window of time identifies a level of contamination of the particulate matter sensor.

In another aspect of the present disclosure, an estimated value of the total water volume is used to determine a duration of the remedial action mode.

According to several aspects, a method for operating a vehicle particulate matter contamination recovery system includes: directing an exhaust gas from an engine through a particulate matter filter; positioning a particulate matter sensor downstream of the particulate matter filter, the particulate matter sensor receiving a non-combustible contaminant on a circuit of the particulate matter sensor; generating a current indicating presence of the non-combustible contaminant on the circuit; passing a total volume of water collected during multiple cold start operations of the engine onto the sensor to dissolve the non-combustible contaminant; and operating the particulate matter sensor in a remedial action mode of operation having no voltage applied to the circuit of the particulate matter sensor until a quantity of the cold start operations corresponding to the total volume of water is achieved.

In another aspect of the present disclosure, the method further includes: determining a current difference between an output current for the particulate matter sensor in a nominal, non-contaminated state and a output current of the particulate matter sensor; and identifying a difference between the current difference and data saved in a lookup table to identify a level of contamination of the particulate matter sensor.

In another aspect of the present disclosure, the method further includes dividing a value of the total volume of water collected during the multiple cold start operations of the engine by a predetermined volume of water produced during one cold start operation of the engine to determine the quantity of the cold start operations corresponding to the total volume of water to achieve cleaning of the particulate matter sensor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
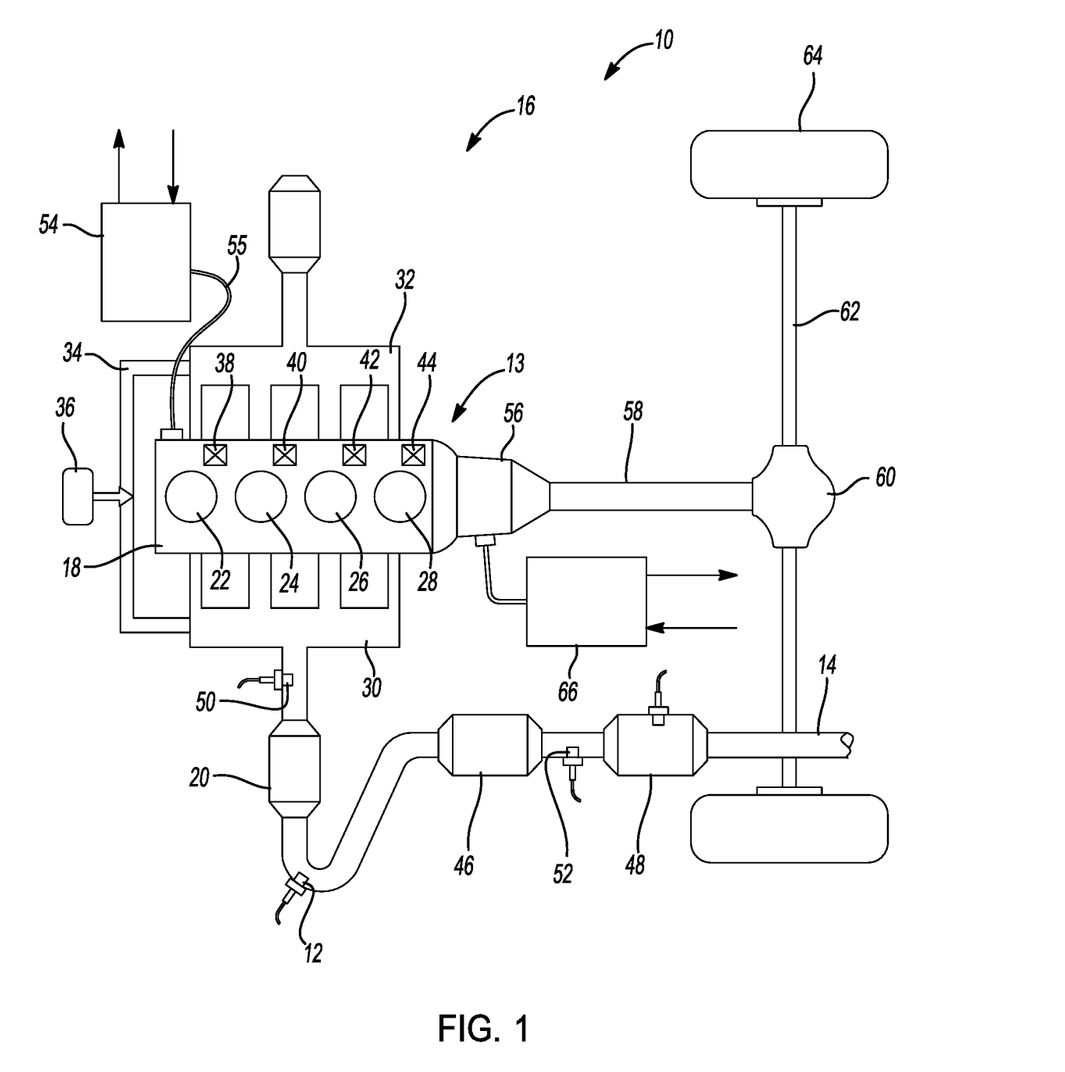
FIG. 1 is a diagrammatic presentation of an automobile vehicle having a particulate matter contamination recovery system according to an exemplary aspect.

Referring to FIG. 1, a particulate matter contamination recovery system 10 provides a system and a cleaning method for cleaning a particulate matter sensor 12 which becomes contaminated by a non-combustible contaminant during operation of the particulate matter contamination recovery system 10. According to several aspects, the particulate matter sensor 12 is part of a vehicle combustion system 13 and is positioned in an exhaust pipe 14 of an automobile vehicle 16 which receives exhaust gas discharged from an engine 18. The engine 18 may be a diesel engine or a gasoline combustion engine. In the exhaust pipe 14, the exhaust gas passes through a particulate matter filter 20 before being discharged to atmosphere. The particulate matter sensor 12 is provided to determine an operating health of the particulate matter filter 20. According to several aspects, the automobile vehicle 16 may include cars, light duty trucks, vans, sport utility vehicles, and the like.

The engine 18 can include multiple cylinders, which in the example shown include a first cylinder 22, a second cylinder 24, a third cylinder 26 and a fourth cylinder 28. Exhaust gas from the cylinders is directed into an exhaust header 30 prior to discharge into the exhaust pipe 14. Air for combustion of a fossil fuel is directed into the cylinders via an intake manifold 32. Exhaust gas recirculation (EGR) may be provided via an EGR line 34 with EGR flow controlled by an EGR control valve 36. One or more of the cylinders can be deactivated using individual cylinder deactivation control devices 38, 40, 42, 44. A catalyst containing device such as a catalytic converter 46 and a muffler 48 may also be positioned in the exhaust pipe 14. Multiple sensors in addition to the particulate matter sensor 12 are also provided in the exhaust pipe 14. These can include a first temperature sensor 50 and a second temperature sensor 52.

Electrical signals generated by the sensors are forwarded to an electronic control unit (ECU) 54 via a sensor communication path 55. The ECU 54 controls operation of the engine 18 and also controls EGR operation and is therefore in communication with the cylinder deactivation control devices 38, 40, 42, 44 and the EGR control valve 36.

The engine 18 provides motive power to a transmission 56 which operates a drivetrain 58. The drivetrain 58 provides power to a differential 60, at least one drive axle 62 and to at least one driven wheel 64. Operational control of the transmission 56 is provided by control signals generated by a transmission electronic control unit (TECU) 66, which may also communicate with the ECU 54.

Referring to FIG. 2 and again to FIG. 1, the particulate matter sensor 12 includes a sensor body 68 having at least one layer onto which is printed or is overlayed a circuit 70. The circuit 70 is connected to a monitoring unit such as the ECU 54 and provided with an electrical current. The circuit 70 is normally open which indicates minimal or no presence of a particulate matter which has passed un-filtered through the particulate matter filter 20. Particulate matter is commonly carbon-based, which is electrically conductive. A voltage potential is normally applied across the circuit 70. Presence of carbon-based particulate matter on the particulate matter filter 20 will therefore close a portion of the circuit 70 and thereby generate an electrical current whose amplitude is indicative of a degree of particulate matter buildup on the particulate matter sensor 12. When the current level exceeds a predetermined threshold, the particulate matter sensor 12 is deemed to be faulted and an error code is generated by the ECU 54. Carbon-based particulate matter is normally combusted and removed from the circuit 70 by the elevated exhaust gas temperatures present during engine operation. The particulate matter sensor 12 can also be cleaned of carbon-based particulate matter buildup by removing the particulate matter sensor 12 and subjecting the particulate matter sensor 12 to a heat treatment operation.

Figure 2:
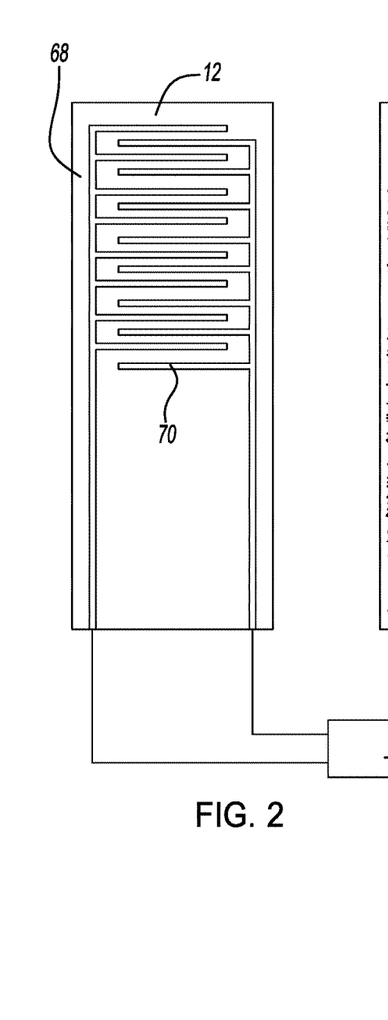
FIG. 2 is a front elevational view of a nominally clean particulate matter sensor used in the particulate matter contamination recovery system of FIG. 1.
Figure 3A:
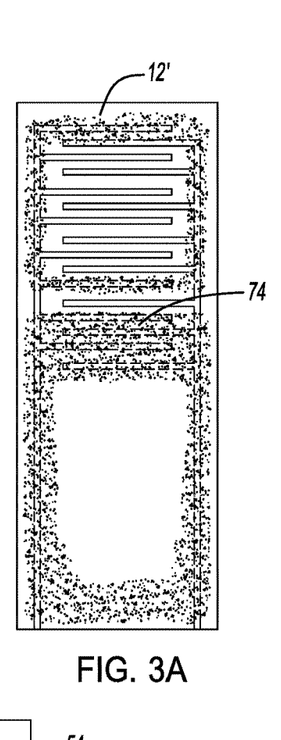
FIGS. 3A, 3B, 3C, 3D are front elevational views similar to FIG. 2 showing the particulate matter sensor of FIG. 2 with different contamination materials on the circuit.
Figure 3B:
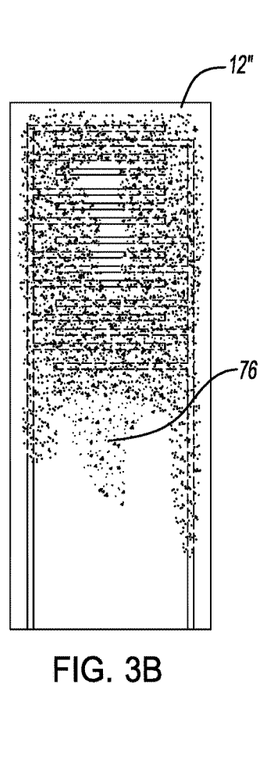
Figure 3C:
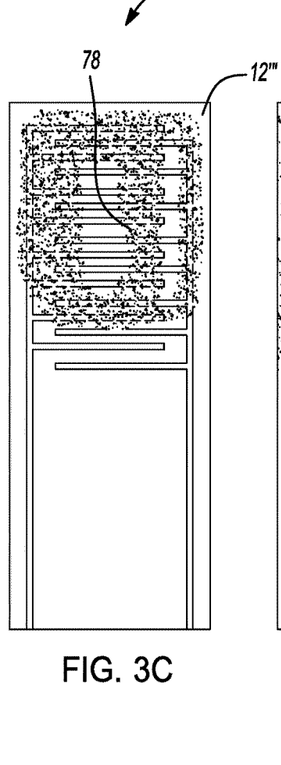
Figure 3D:
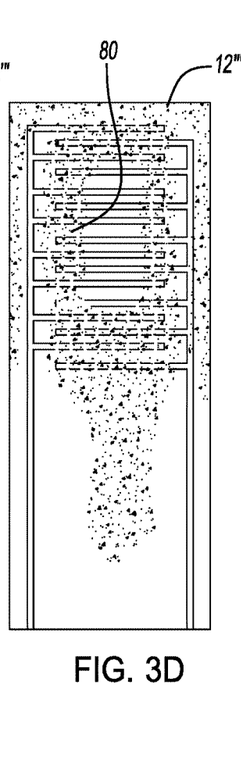

Referring to FIGS. 3A, 3B, 3C and 3D, and with continuing reference to FIG. 2, particulate matter contamination which can build up on the circuit 70 can also result from generally non-consumable or non-combustible contaminants, hereinafter generally referred to as "non-combustible" contaminants are passed through an exhaust system during fuel combustion, and may result from consumption of coolant or oil, or may be contained in a water content of a fuel or in inducted air, and from other sources. With particular reference to FIG. 3A, the non-combustible contaminants can include sodium 74 shown on an exemplary particulate matter sensor 12'. With particular reference to FIG. 3B, non-combustible contaminants can include calcium 76 shown on an exemplary particulate matter sensor 12". With particular reference to FIG. 3C, non-combustible contaminants can include manganese 78 shown on an exemplary particulate matter sensor 12'''. With particular reference to FIG. 3D, non-combustible contaminants can include magnesium 80 shown on an exemplary particulate matter sensor 12''''. The non-combustible contaminants can also include any conductive water-soluble contaminant. The non-combustible contaminants of sodium 74, calcium 76, manganese 78 and magnesium 80 are conductive and can therefore close or at least partially close the circuit 70 if present. It is noted the electrical signal generated during current flow from the circuit 70 can be used to distinguish between carbon-based particulate matter, which is combustible and the non-combustible contaminants sodium 74, calcium 76, manganese 78 and magnesium 80.

Referring to FIG. 4 and again to FIGS. 1, 2 and 3A, 3B, 3C and 3D the non-combustible contaminants of sodium 74, calcium 76, manganese 78 and magnesium 80 are water-soluble, and can therefore be removed from the circuit 70 by water dissolution if a source of water is present. It has been determined that cold start engine operations generate water condensation in the exhaust pipe 14 and the exhaust header 30 which may be beneficial in dissolving the non-combustible contaminants sodium 74, calcium 76, manganese 78 and magnesium 80 which are soluble in water. As used herein, a "cold start" operation is defined as an engine start when the engine 18 is initially at an ambient temperature. An approximate volume of water condensed during individual cold start operations is predetermined based on engine design.

The vehicle combustion system 13 produces liquid water on and around the particulate matter sensor 12 during all vehicle cold starts that can be used to dissolve the predominant types of solid non-combustible contaminants located on the particulate matter sensor 12. Gaseous water ($H_2O$) and carbon dioxide ($CO_2$) are generated from combustion during vehicle cold start operations per the following equation from combustion of a fossil fuel ($C_xH_y$) in the presence of oxygen ($O_2$):

Eq. 1:

It has been determined that a total volume of water to dissolve the non-combustible contaminants sodium 74, calcium 76, manganese 78 and magnesium 80 may include adding a total volume of water condensed during multiple cold start operations. Because subsequent hot operation of the engine 18 and the exhaust pipe 14 after an individual cold start operation, or a warm startup when the engine has not been allowed to cool to ambient temperature allows contaminants to further reattach to the circuit 70, it is desirable to isolate the circuit 70 of the particulate matter sensor 12 during recovery from contaminant buildup. According to several aspects, the method for operation of the particulate matter contamination recovery system 10 uses a remedial action mode of operation 82 of the particulate matter sensor 12.

Figure 4:
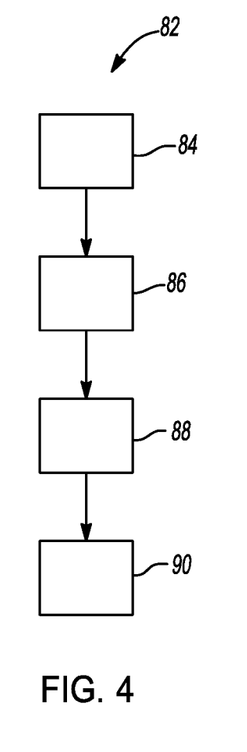
FIG. 4 is a flowchart identifying method steps for use of the system of FIG. 1.

The remedial action mode of operation 82 includes in a first step 84 identifying when contamination on the circuit 70 is present indicated by a current from the circuit 70 surpassing a predetermined threshold. In a second step 86 a level of recovery based on a calculated amount of contamination present is determined. In a third step 88 based on a known or predetermined volume of water condensed during an individual cold start operation, a quantity of cold start operations to generate a total volume of water to dissolve the calculated amount of contamination of the non-combustible contaminants from the circuit 70 is identified. In a fourth step 90 the particulate matter sensor 12 is isolated and operated in the remedial action mode of operation 82 until the quantity of cold start operations to generate the total volume of water identified in the third step 88 has been achieved. According to several aspects the quantity of cold start operations performed to obtain the total volume of water is at least two.

Referring to FIG. 5 and again to FIGS. 2 through 4, a graph 92 compares a current 94 output from the particulate matter sensor 12 over a period-of-time 96. A first curve 98 represents an output current for a nominal, non-contaminated sensor as-received for initial system installation. A second curve 100 represents an output current from a contaminated particulate matter sensor 12 which has surpassed a predetermined threshold. A third curve 102 represents an output current from the particulate matter sensor 12 after completion of a cleaning operation using the remedial action mode of operation 82 discussed above. It is desirable for the current amplitude represented by the third curve 102 to match or be within approximately 1 to 2 mA of the first curve 98 defining the output current for the nominal, non-contaminated sensor.

Figure 5:
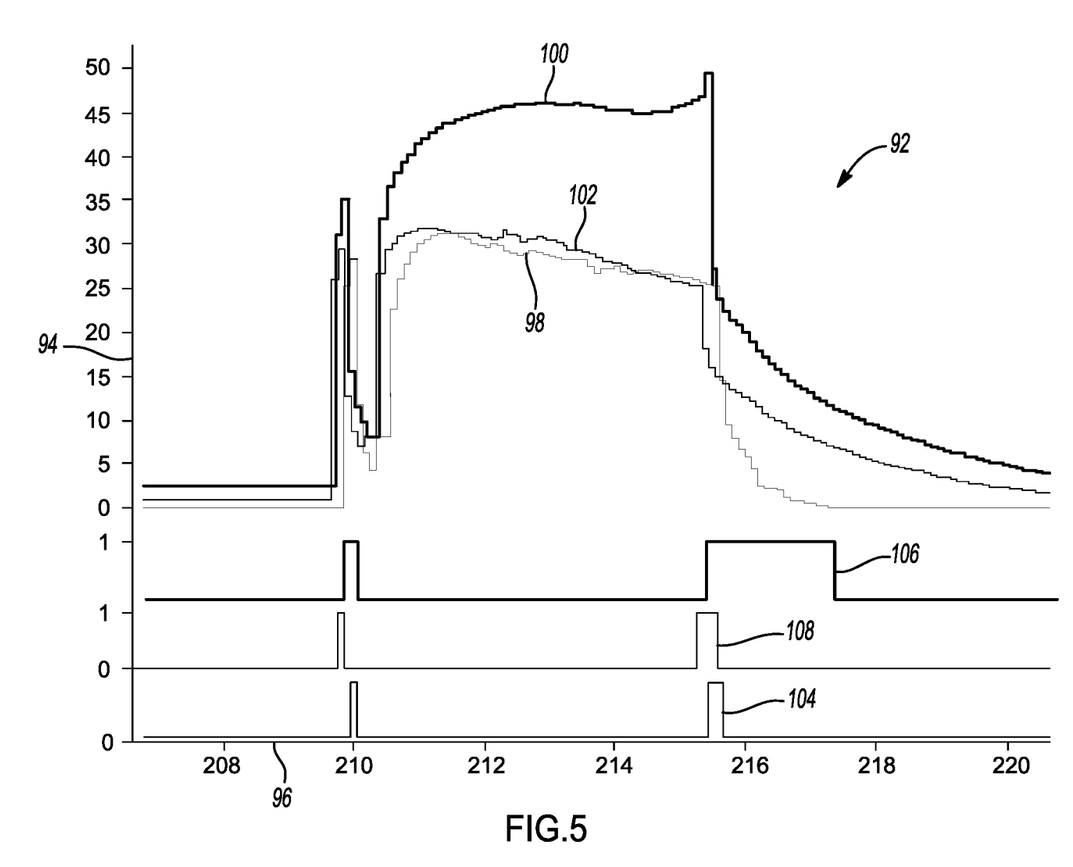
FIG. 5 is a graph showing output current over time for particulate matter sensors prior to and after use of the system of FIG. 1.

The graph 92 also presents exemplary fault time curves for particulate matter sensors 12. A system fault may be set for example when a failure time of the particulate matter sensor is 600 ms or greater. A first fault time curve 104 identifies a new particulate matter sensor 12 has a failure time of approximately 200 ms. A second fault time curve 106 having a failure time of approximately 2000 ms represents the fault time for the contaminated sensor which exceeds the system fault occurring at the 600 ms failure time threshold. A third fault time curve 108 having a failure time of approximately 300 ms for the particulate matter sensor 12 after cleaning meets or is below the fault time predetermined at 600 ms or higher, therefore the particulate matter sensor 12 after cleaning using the remedial action mode of operation 82 presents a failure time reduced from 2000 ms to approximately 300 ms. The above values can be varied higher or lower to optimize when remedial action is warranted and to optimize the cleaning process.

Figure 6:
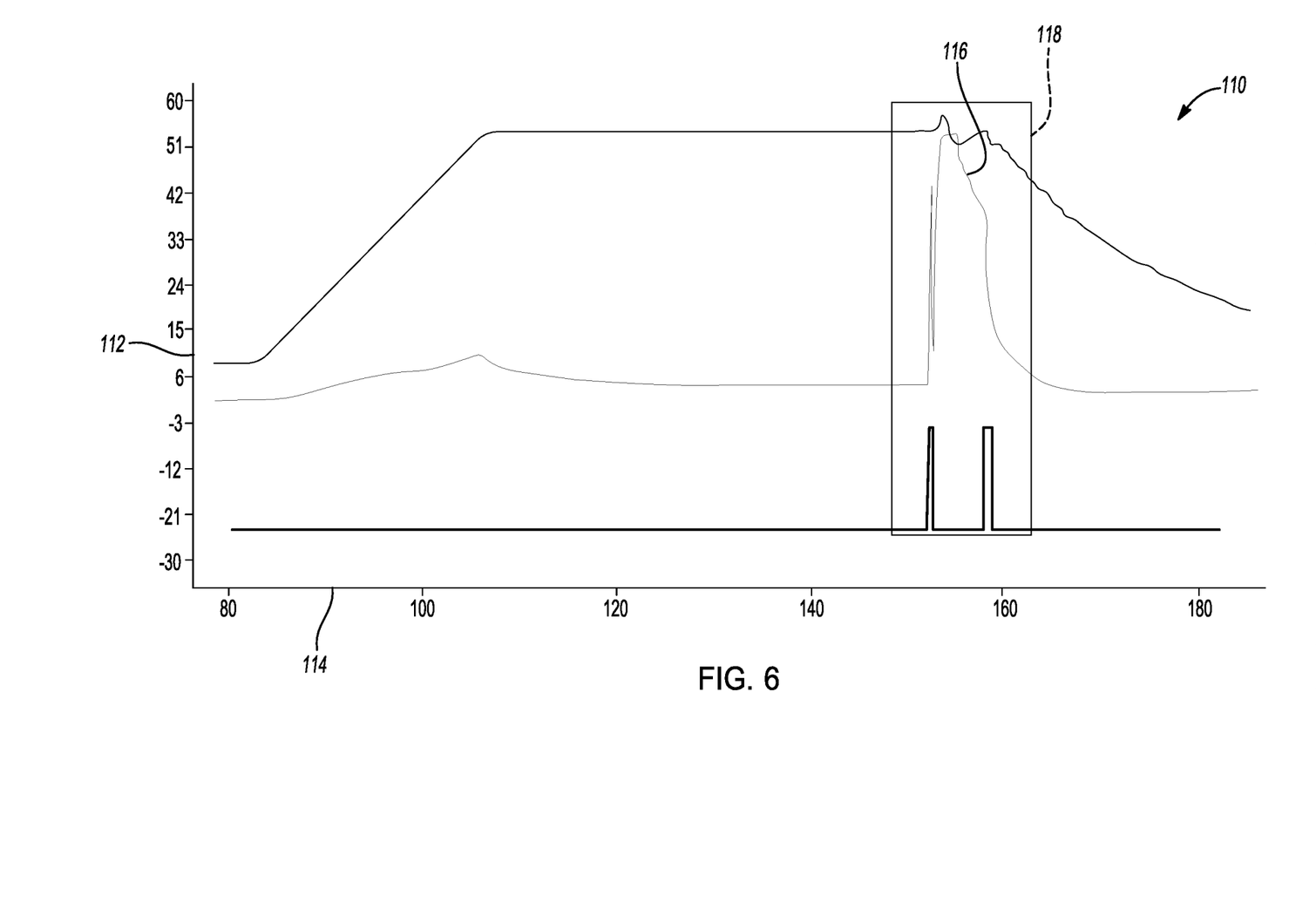
FIG. 6 is a graph showing a peak sensor current identifying when operation of the system of FIG. 1 is warranted.

Referring to FIG. 6 and again to FIGS. 1, 2 and 4, a graph 110 identifies a current 112 generated by the particulate matter sensor 12 over a time period 114. The graph 110 provides for an algorithm first or initial decision made to determine if the remedial action mode of operation 82 is warranted. A predetermined current response 116 produced within a window of time 118 identifies a level of contamination of the particulate matter sensor 12.

With continuing reference to FIG. 5 and FIGS. 1 through 4, a current difference between the second curve 100 representing the output current for the nominal, non-contaminated sensor and the output current of the third curve 102 is determined. This current difference is compared for example to data saved in a lookup table of the ECU 54 and a difference between the current difference and the data in the lookup table equates to a level of contamination of the particulate matter sensor 12. A predetermined volume of water to clean the level of contamination present is then calculated. This calculation is performed by dividing the predetermined volume of water by a known or calculated volume of water produced during one cold start operation to determine a quantity of cold water start water cycles to achieve sensor cleaning. The particulate matter contamination recovery system 10 puts the particulate matter sensor 12 into the remedial action mode of operation 82 for the duration of the quantity of cold start cycles to achieve sensor cleaning. Sensor cleaning using the particulate matter contamination recovery system 10 restores particulate matter sensor 12 performance while mitigating a risk of further contamination of the particulate matter sensor 12.

Referring again to FIG. 1, the particulate matter contamination recovery system 10 provides the ECU 54 to sensor communication path 55 that commands the particulate matter sensor 12 to remain in a "dormant" or "accessory" state during a cleaning operation mitigating against the conditions that cause further contaminants to be attracted to the particulate matter sensor 12. Conditions that cause further contaminants to be attracted to the particulate matter sensor 12 may include system operational temperatures above atmospheric temperature and provision of a supply voltage to the circuit 70 of the particulate matter sensor 12. The particulate matter sensor 12 is retained in this dormant state defining the remedial action mode of operation 82 until the predetermined amount of remedial action exposure has been reached. During the remedial action mode of operation 82 the particulate matter sensor 12 is inoperative with a zero supply voltage applied to the circuit 70 and at an exhaust system operating temperature.

The particulate matter contamination recovery system 10 can be used in multiple operating states. In an exemplary first operating state, the particulate matter contamination recovery system 10 is operated using an alternate particulate matter sensor 12 state when the presence of contamination is detected in order to mitigate the contamination as a remedial action. For example, and with continuing reference to FIG. 2 a supply voltage to the circuit 70 can be isolated. In an exemplary second operating state, the condensed water resulting from fossil fuel combustion from one or more vehicle cold start operations is used as a cleaning mechanism for dissolving the contamination. In an exemplary third operating state, a model which can include an estimated value of total water volume to clean the particulate matter sensor 12 or a predetermined value recovered from a system memory provided for example in the ECU 54 is used to determine a duration of the remedial action to effectively remove the contamination in order to restore the proper function of the particulate matter sensor 12. The model data can be predetermined based on test data and saved in the system memory.

A particulate matter contamination recovery system 10 of the present disclosure offers several advantages. These include providing methods of controlling a particulate matter sensor to mitigate contamination on the particulate matter sensor using conditions present during and following normal vehicle operating conditions of a cold start.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle particulate matter contamination recovery system, comprising:
a filter;
a sensor positioned downstream of the filter, the sensor collecting a non-combustible contaminant; and
a volume of water passing onto the sensor acting to dissolve the non-combustible contaminant.

2. The vehicle particulate matter contamination recovery system of claim 1, wherein the filter defines a particulate matter filter.

3. The vehicle particulate matter contamination recovery system of claim 2, wherein the sensor defines a particulate matter sensor.

4. The vehicle particulate matter contamination recovery system of claim 3, wherein the volume of water is created during a cold start operation of an engine and an exhaust system discharging exhaust gas into the filter, the cold start operation defining an engine start when the engine and the exhaust system are initially at an ambient temperature and below a dew point.

5. The vehicle particulate matter contamination recovery system of claim 3, wherein the volume of water is created during multiple cold start operations of an engine connected to and discharging exhaust gas into the filter and wherein the particulate matter sensor is operated with a zero supply voltage to a sensor circuit for a quantity of the multiple cold start operations performed to obtain the volume of water.

6. The vehicle particulate matter contamination recovery system of claim 5, wherein:
the engine defines a fossil fuel burning engine; and
the quantity of the multiple cold start operations performed to obtain the volume of water is at least two.

7. The vehicle particulate matter contamination recovery system of claim 1, wherein the non-combustible contaminant includes a conductive sodium operating to at least partially close a circuit of the sensor until dissolved by the volume of water.

8. The vehicle particulate matter contamination recovery system of claim 1, wherein the non-combustible contaminant includes a conductive calcium operating to at least partially close a circuit of the sensor until dissolved by the volume of water.

9. The vehicle particulate matter contamination recovery system of claim 1, wherein the non-combustible contaminant includes a conductive manganese operating to at least partially close a circuit of the sensor until dissolved by the volume of water.

10. The vehicle particulate matter contamination recovery system of claim 1, wherein the non-combustible contaminant includes a conductive water-soluble contaminant operating to at least partially close a circuit of the sensor until dissolved by the volume of water.

11. A vehicle particulate matter contamination recovery system, comprising:
   a particulate matter filter receiving exhaust gas from an engine;
   a particulate matter sensor positioned downstream of the particulate matter filter, the particulate matter sensor collecting a non-combustible contaminant on a circuit of the particulate matter sensor and generating a current indicating presence of the non-combustible contaminant; and
   a total volume of water collected during multiple cold start operations of the engine passed onto the particulate matter sensor acting to at least partially dissolve the non-combustible contaminant; and
   wherein the particulate matter sensor is operated in a remedial action mode of operation having no voltage applied to the circuit of the particulate matter sensor until a quantity of the cold start operations corresponding to the total volume of water is reached.

12. The vehicle particulate matter contamination recovery system of claim 11, further including a current difference determined between an output current for the particulate matter sensor in a nominal, non-contaminated state and an output current of the particulate matter sensor.

13. The vehicle particulate matter contamination recovery system of claim 12, wherein a difference between the current difference and data saved in a lookup table defines a level of contamination of the particulate matter sensor.

14. The vehicle particulate matter contamination recovery system of claim 13, wherein the total volume of water collected during the multiple cold start operations of the engine is divided by a predetermined volume of water produced during one cold start operation of the engine to determine the quantity of the cold start operations corresponding to the total volume of water to achieve cleaning of the particulate matter sensor.

15. The vehicle particulate matter contamination recovery system of claim 14, wherein the particulate matter sensor is maintained in a dormant state during cleaning of the particulate matter sensor mitigating conditions that cause further contaminants to be attracted to the particulate matter sensor.

16. The vehicle particulate matter contamination recovery system of claim 11, further including a predetermined current response produced within a window of time identifies a level of contamination of the particulate matter sensor.

17. The vehicle particulate matter contamination recovery system of claim 11, wherein an estimated value of the total water volume is used to determine a duration of the remedial action mode of operation.

18. A method for operating a vehicle particulate matter contamination recovery system, comprising:
   directing an exhaust gas from an engine through a particulate matter filter;
   positioning a particulate matter sensor downstream of the particulate matter filter, the particulate matter sensor receiving a non-combustible contaminant on a circuit of the particulate matter sensor;
   generating a current indicating presence of the non-combustible contaminant on the circuit;
   passing a total volume of water collected during multiple cold start operations of the engine onto the particulate matter sensor to dissolve the non-combustible contaminant; and
   operating the particulate matter sensor in a remedial action mode of operation having no voltage applied to the circuit of the particulate matter sensor until a quantity of the cold start operations corresponding to the total volume of water is achieved.

19. The method for operating the vehicle particulate matter contamination recovery system of claim 18, further including:
   determining a current difference between an output current for the particulate matter sensor in a nominal, non-contaminated state and a output current of the particulate matter sensor; and
   identifying a difference between the current difference and data saved in a lookup table to identify a level of contamination of the particulate matter sensor.

20. The method for operating the vehicle particulate matter contamination recovery system of claim 18, further including dividing a value of the total volume of water collected during the multiple cold start operations of the engine by a predetermined volume of water produced during one cold start operation of the engine to determine the quantity of the cold start operations corresponding to the total volume of water to achieve cleaning of the particulate matter sensor.

* * * * *